US011549690B2

United States Patent
(12) Braden et al.

(10) Patent No.: US 11,549,690 B2
(45) Date of Patent: Jan. 10, 2023

(54) TEMPERATURE DETECTOR POSITIVE MOTION STOP

(71) Applicants: BSH Home Appliances Corporation, Irvine, CA (US); BSH Hausgeräte GmbH, Munich (DE)

(72) Inventors: Ben Braden, Lafollette, TN (US); Ronald Allen Diehl, LaFollette, TN (US); Rose Marie Parker, Caryville, TN (US); Bryan Umphrey, LaVergne, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 896 days.

(21) Appl. No.: 16/424,522

(22) Filed: May 29, 2019

(65) Prior Publication Data

US 2020/0378612 A1 Dec. 3, 2020

(51) Int. Cl.

| | |
|---|---|
| ***G01K 1/14*** | (2021.01) |
| ***F24C 7/08*** | (2006.01) |
| ***F24C 7/06*** | (2006.01) |

(52) U.S. Cl.

CPC .................. *F24C 7/08* (2013.01); *F24C 7/06* (2013.01); *G01K 1/14* (2013.01)

(58) Field of Classification Search

CPC ................ F24C 7/08; F24C 7/06; G01K 1/14

See application file for complete search history.

(56) References Cited

U.S. PATENT DOCUMENTS

| | | | |
|---|---|---|---|
| 4,357,522 A | 11/1982 | Husslein et al. | |
| 4,757,184 A | 7/1988 | swanson et al. | |
| 4,852,544 A | 8/1989 | Williams et al. | |
| 4,927,998 A | 5/1990 | Tamura et al. | |
| 6,445,371 B1 | 9/2002 | Miyazawa et al. | |
| 9,200,809 B2 | 12/2015 | Knight | |
| 10,753,621 B2 * | 8/2020 | Johnson | G01K 1/08 |
| 2015/0090706 A1 | 4/2015 | Choi | |
| 2019/0212013 A1 * | 7/2019 | Blum | G01K 1/024 |

FOREIGN PATENT DOCUMENTS

| | | |
|---|---|---|
| CH | 678682 A5 | 10/1991 |

* cited by examiner

*Primary Examiner* — Hongmin Fan

(74) *Attorney, Agent, or Firm* — Michael E. Tschupp; Andre Pallapies; Brandon G. Braun

(57) ABSTRACT

A domestic cooking appliance for heating a food item is provided. The domestic cooking appliance includes a housing; a cooking chamber located in the housing and having a wall, the cooking chamber being configured to contain the food item while the food item is being heated; a heating element that provides heat to the cooking chamber for heating the food item; a temperature detector located in the cooking chamber and configured to detect a temperature in the cooking chamber; and a temperature detector positive motion stop located in the cooking chamber and surrounding a portion of the temperature detector.

13 Claims, 6 Drawing Sheets

100 210 200 230 125 120 220 240

TEMPERATURE DETECTOR POSITIVE MOTION STOP

FIELD OF THE INVENTION

The invention is directed to a domestic cooking appliance. More particularly, embodiments of the invention are directed to a protective device for protecting a resistive temperature detector in an oven.

An example of an application for the invention is a domestic kitchen oven having a resistive temperature detector located in a location that is beneficial to accurate temperature readings and is protected by a protective device.

BACKGROUND OF THE INVENTION

Some modern domestic kitchens include cooking appliances such as ovens and ranges that have a temperature detector that detects the temperature in a cooking chamber of the cooking appliance. In some cases, the temperature detector extends into the cooking chamber so that it is in contact with air in the cooking chamber in order to detect the temperature of the air in the cooking chamber.

Applicants recognized an improvement to the above arrangement and implement that improvement in embodiments of the invention.

SUMMARY

The invention achieves the benefit of providing a temperature detector in a location in a cooking chamber that results in an accurate reading of an average temperature of the air in the cooking chamber. A temperature gradient can exist in a cooking chamber of a domestic kitchen oven such that the temperature at an upper portion of the cooking chamber is different than the temperature at a lower or middle portion of the cooking chamber. Due to a design dictated by their temperature detecting performance, some temperature detectors are relatively weak and subject to damage from contact.

In some domestic kitchen ovens, a temperature detector is positioned at an upper corner of the cooking chamber to avoid contact with cooking utensils and/or racks that support cooking utensils. While such a location might reduce the likelihood of a cooking utensil or rack contacting (and damaging) the temperature detector, it is not an optimal location for detecting the average temperature in the cooking chamber.

Embodiments of the invention provide a temperature detector positioned in a cooking chamber of a domestic cooking appliance such that the temperature detector more accurately detects an average temperature in the cooking chamber. Embodiments provide a positive motion stop positioned around the temperature detector to protect the temperature detector due to the temperature detector's placement in a position that is more likely subject to contact than a more remote location of the temperature detector.

Particular embodiments of the invention are directed to a domestic cooking appliance for heating a food item that includes a housing; a cooking chamber located in the housing and having a wall, the cooking chamber being configured to contain the food item while the food item is being heated; a heating element that provides heat to the cooking chamber for heating the food item; a temperature detector located in the cooking chamber and configured to detect a temperature in the cooking chamber; and a temperature detector positive motion stop located in the cooking chamber and surrounding a portion of the temperature detector.

In some embodiments, the wall has a height within the cooking chamber, a detector location zone is an area having a height equal to 50% of the height of the wall and centered vertically on the wall; and the temperature detector is located in the detector location zone.

Other embodiments of the invention are directed to a temperature detector and temperature detector positive motion stop combination for use in a domestic cooking appliance for heating a food item, the domestic cooking appliance having a housing; a cooking chamber located in the housing and having a wall, the cooking chamber being configured to contain the food item while the food item is being heated; and a heating element that provides heat to the cooking chamber for heating the food item. The combination includes a temperature detector configured to be located in the cooking chamber and configured to detect a temperature in the cooking chamber; and a temperature detector positive motion stop configured to be located in the cooking chamber and surrounding a portion of the temperature detector.

In some embodiments, the temperature detector positive motion stop surrounds an entirety of a portion of the temperature detector that is configured to be present in the cooking chamber.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

As explained above, embodiments of the invention provide an improvement to a domestic oven or other cooking appliance.

Figure 1:
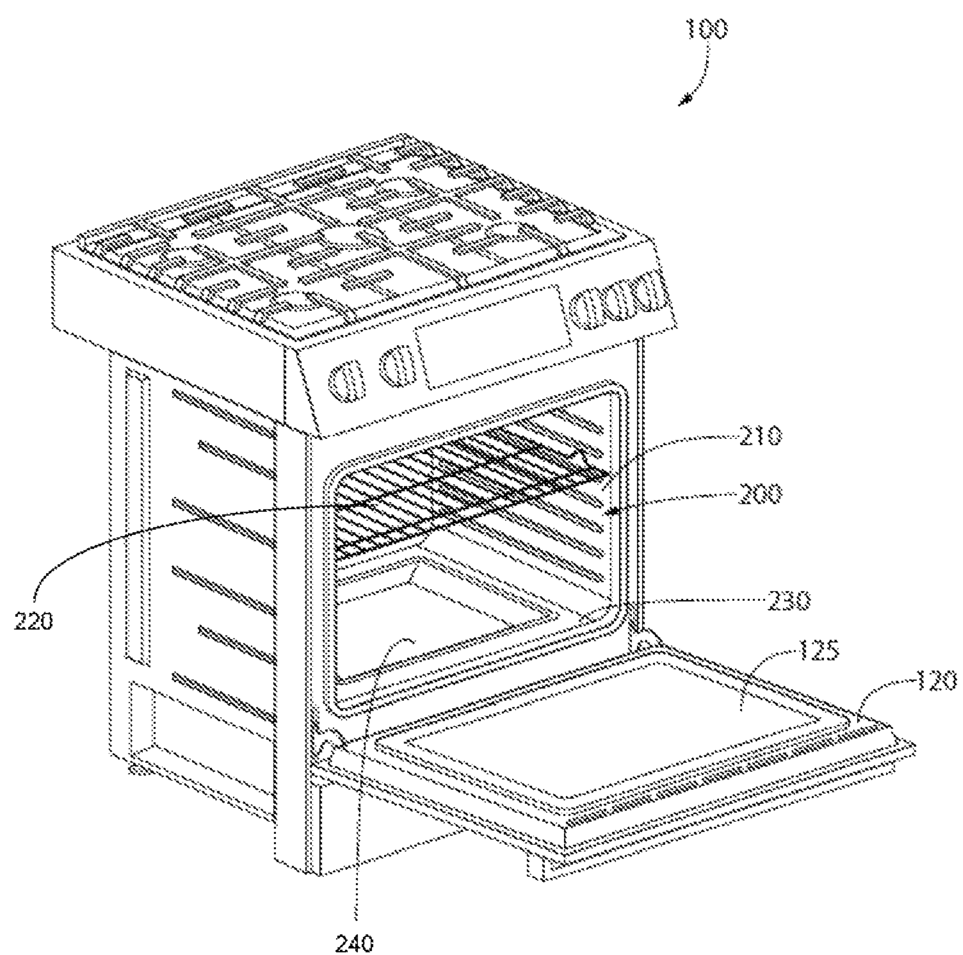
FIG. 1 is a perspective schematic view of a domestic kitchen appliance in accordance with embodiments of the invention.

FIG. 1 shows an example of a domestic kitchen appliance 100 in accordance with embodiments of the invention. Appliance 100 has, in this example, a door 120 with a glass panel 125, and a cooking chamber 200. Food items to be heated are placed in cooking chamber 200 for heating and/or cooking. Cooking chamber 200 has a bottom 230 with a heating element area 240, a side wall 210 and a back wall 220.

Figure 2:
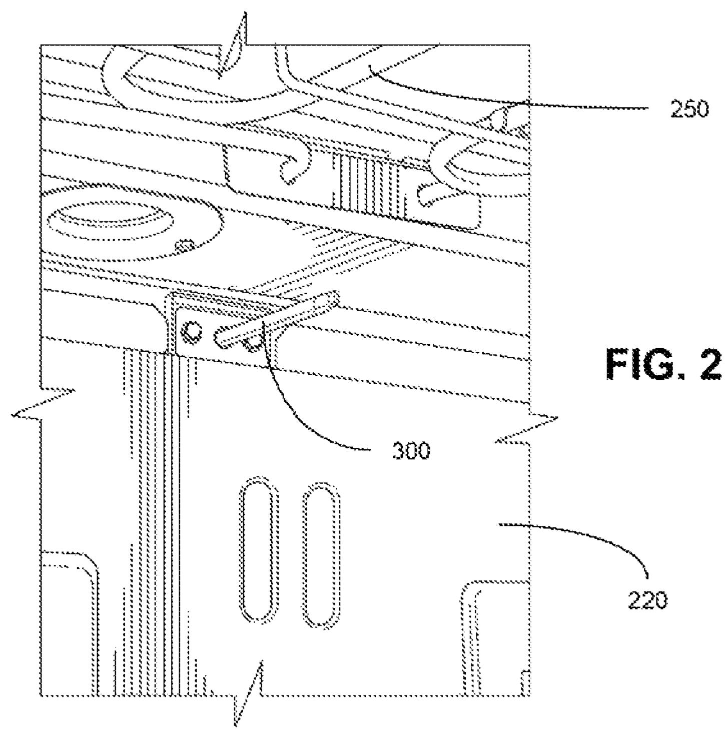
FIG. 2 is a perspective schematic view of a temperature detector in a first position in a cooking chamber of a domestic kitchen appliance.

FIG. 2 is a partial interior view of appliance 100 that shows back wall 220, and a heating element 250 located near an upper surface of cooking chamber 200. In this example, heating element 250 is an electric heating element. However, in other embodiments, heating element 250 can be a gas heating element or some other type of heating element. Some embodiments include a plurality of heating elements located at various locations in cooking chamber 200.

Also shown in FIG. 2 is a temperature detector 300 mounted near the upper surface of cooking chamber 200. This location of temperature detector 300 provides a reduced chance of temperature detector 300 being contacted, and potentially damaged, by a cooking utensil or other object. However, this location of temperature detector 300 can result in a temperature reading that is not indicative of an average temperature in cooking chamber 200. Further, this location of temperature detector 300 can result in a temperature reading that is not indicative of a temperature that a food item experiences if the food item is placed on a rack or other structure that is located in a vertically central location in cooking chamber 200. This is especially true if a broil element is used during a cooking procedure due to the placement of temperature detector 300 near the broil element and, as a result, temperature detector 300 detecting temperature close to the broil element (which is not indicative of an average temperature of cooking chamber 200, and/or a temperature to which a food item is subjected). These two factors (protection of temperature detector 300 and accurate temperature detection) can be in conflict with each other because locations that provide a more accurate reading of the temperature to which a food item is subjected are also the locations that are more likely to result in the temperature detector being damaged.

Figure 3:
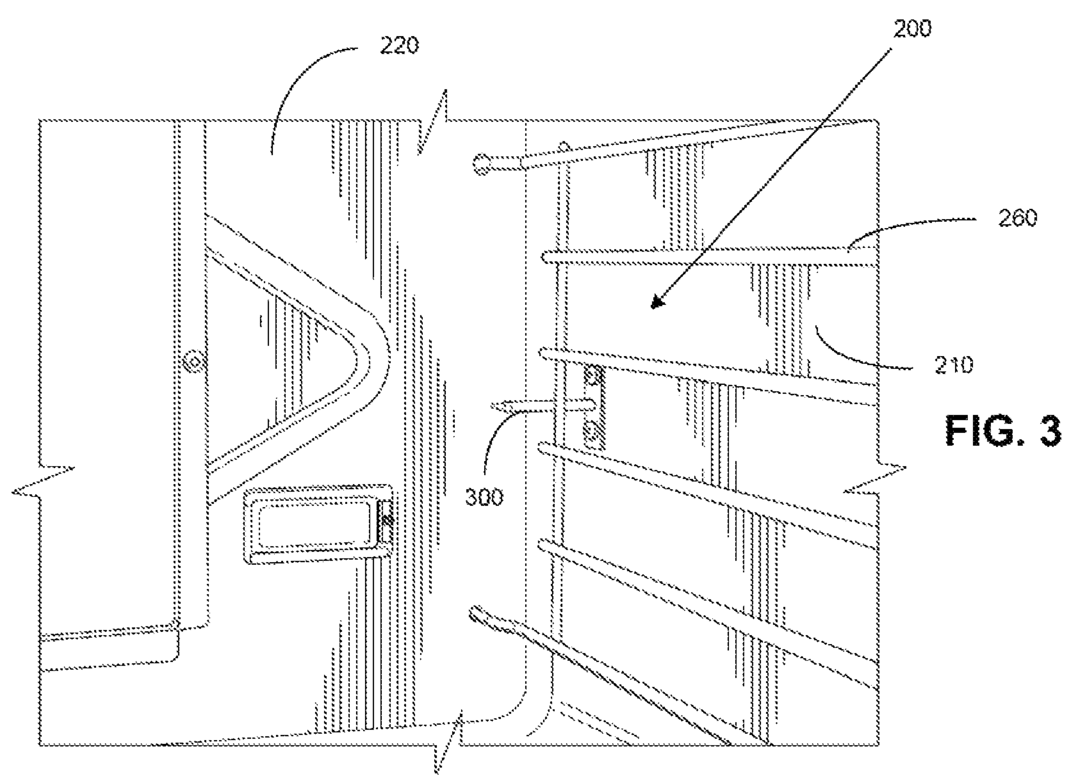
FIG. 3 is a perspective schematic view of a temperature detector in a second position in a cooking chamber of a domestic kitchen appliance.

FIG. 3 shows an example of a cooking chamber 200 in which a temperature detector 300 is located in a vertically central location in cooking chamber 200. In this example, temperature detector 300 is attached to side wall 210 and extends into cooking chamber 200 parallel to back wall 220. Also shown in FIG. 3 is a rack support 260 which supports one or more racks or shelves used to support cooking vessels and/or food items. While the location of temperature detector 300 shown in FIG. 3 might be advantageous with regard to accurate sensing of temperature in a vertically central location in cooking chamber 200, it is a location that can subject temperature detector 300 to an increased risk of being contacted (and therefore damaged) by a rack, cooking vessel, or food item. A rack, cooking vessel, or food item is more likely to contact temperature detector 300 in the location shown in FIG. 3 than in the location shown in FIG. 2.

Figure 4:
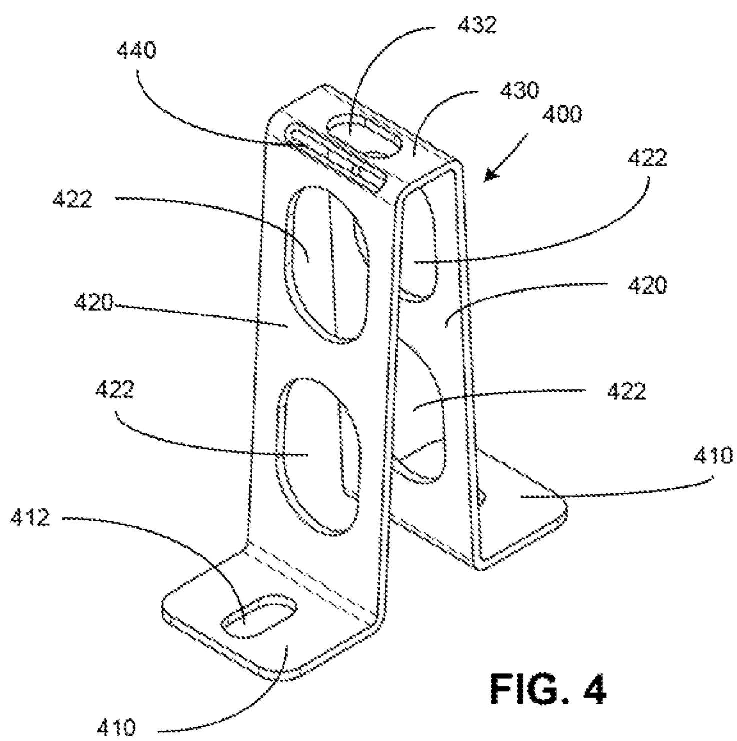
FIG. 4 is a perspective view of an exemplary temperature detector positive motion stop in accordance with embodiments of the invention.
Figure 5:
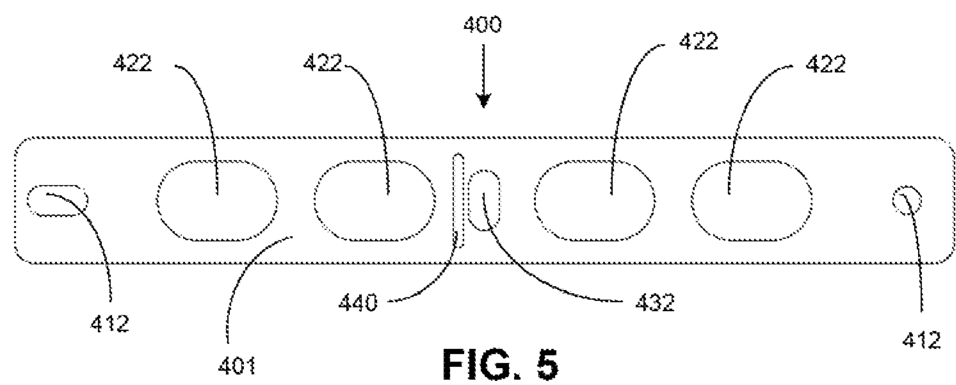
FIG. 5 is a top view of an exemplary temperature detector positive motion stop in accordance with embodiments of the invention before being bent into a finished shape.

Embodiments of the invention provide a solution to the conflicting factors discussed above with regard to the placement of temperature detector 300. FIG. 4 shows an example of a temperature detector positive motion stop 400 in accordance with embodiments of the invention. In this example, temperature detector positive motion stop 400 is fabricated from a flat piece of material such as, for example, stainless steel or some other material that is strong enough to withstand being forcefully contacted by a rack, cooking vessel, food item, or other object in cooking chamber 200.

The temperature detector positive motion stop 400 shown in FIG. 4 has base sections 410 which each have a mounting opening 412. A screw or other fastener is inserted into each mounting opening 412 and fastened to a wall or other portion of cooking chamber 200. In some embodiments, mounting openings 412 align with mounting openings in temperature detector 300 so that the same fasteners attach temperature detector 300 and temperature detector positive motion stop 400 to the cooking chamber. Side sections 420 each have, in this example, two openings 422 through which air can pass in order to subject temperature detector 300 to air that is in cooking chamber 200. The large area of openings relative to the solid area of temperature detector positive motion stop 400 allows the temperature of the air that contacts temperature detector 300 to be the same as the temperature of the air that is outside of temperature detector positive motion stop 400. For accurate temperature sensing, it is beneficial to have the temperature of the air that contacts temperature detector 300 to be the same as the temperature of the air that is outside of temperature detector positive motion stop 400. An end section 430 connects the two side sections 420 and has, in this example, an opening 432 through which air can pass in order to subject temperature detector 300 to air that is in cooking chamber 200. This example has a relief slot 440 that both lets air pass in order to subject temperature detector 300 to air that is in cooking chamber 200, and relieves stress on the material to reduce the likelihood of the material breaking during manufacturing. The number, shape, and pattern of openings 412, 422, 432, 440 are only examples of openings that can be provided in temperature detector positive motion stop 400. Other numbers, shapes, and patterns of openings can also be provided.

Figure 6:
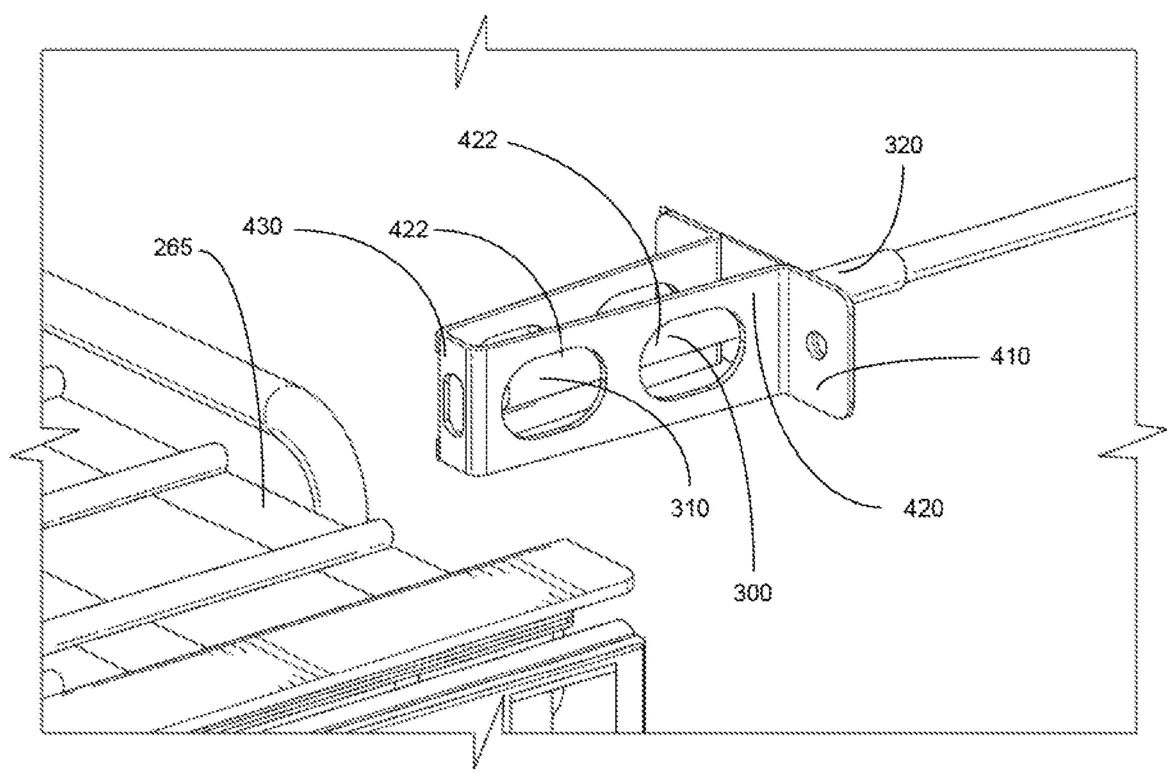
FIG. 6 is a partial perspective schematic view of a domestic kitchen appliance in accordance with embodiments of the invention.

FIG. 6 shows an example of temperature detector positive motion stop 400 in position around temperature detector 300. The back wall of the cooking chamber has been omitted in FIG. 6 to show how, in this example, temperature detector 300 has an in-chamber portion 310 and an out of chamber portion 320. In-chamber portion 310 includes the sensing portion of temperature detector 300 that is located in cooking chamber 200 and senses the temperature in cooking chamber 200. Out of chamber portion 320 extends behind the wall of cooking chamber 200 and leads to the electrical and/or other connections that connect temperature detector 300 to control portions of appliance 100. Also shown in FIG. 6 is a rack 265 that represents various racks and other structure in cooking chamber 200 (shown in more detail in FIG. 8).

FIG. 6 shows temperature detector positive motion stop 400 in position around temperature detector 300 such that temperature detector positive motion stop 400 protects temperature detector 300 from being contacted (and potentially damaged) by rack 265, other support structure, cooking vessels, food items, and/or other items. In this example, temperature detector positive motion stop 400 has a trapezoidal cross section that provides more strength than a rectangular cross section. This shape helps protect temperature sensor 300 from, for example, a rack or food item being slammed into temperature detector positive motion stop 400 when door 120 of appliance 100 is closed forcefully by a user of appliance 100 due at least to the angled side sections 420 that form the sides of the trapezoidal cross section. The trapezoidal cross section resists bending or deformation, especially in a direction toward the side of temperature detector positive motion stop 400.

Figure 7:
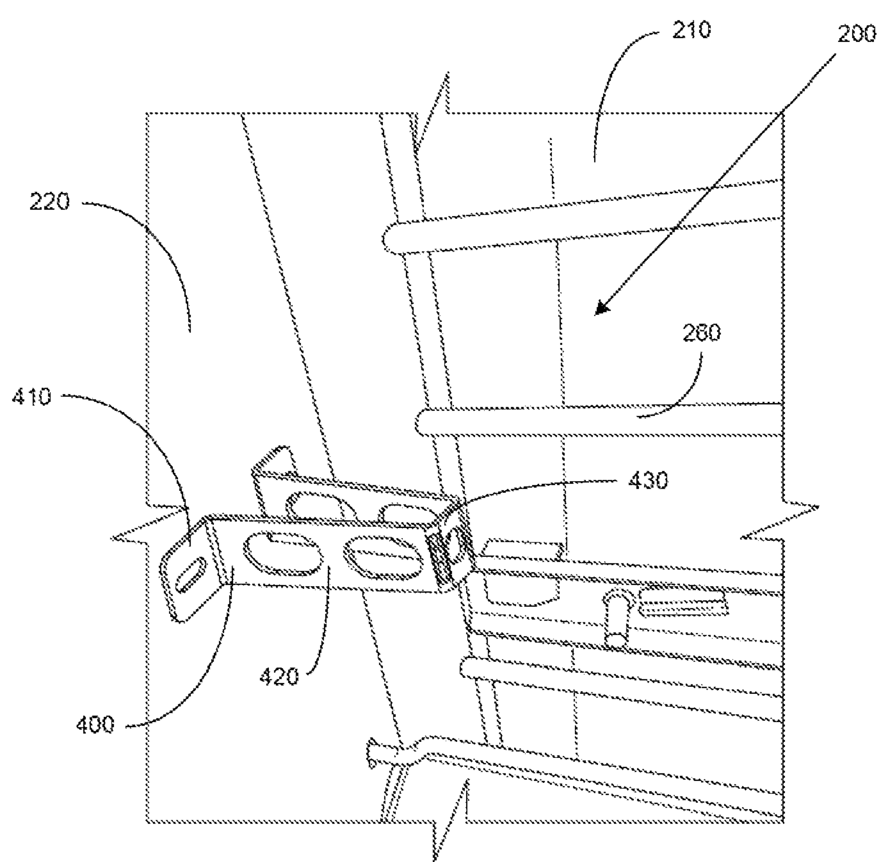
FIG. 7 is a partial perspective schematic view of a domestic kitchen appliance in accordance with embodiments of the invention.

FIG. 7 shows temperature detector positive motion stop 400 positioned on back wall 220 of cooking chamber 200. As discussed above, this location is advantageous with regard to temperature sensing because it is in the middle 50% of the vertical dimension of cooking chamber 200. While a vertically central position may be optimal (with regard to temperature sensing) for temperature detector 300, a location in the middle 50% vertically also provides very good sensing to represent the temperature to which a food item is being subjected. Other advantageous embodiments place temperature detector 300 in the middle 25% vertically, the middle 10% vertically, or the middle 5% vertically.

While the example in FIG. 7 places temperature detector 300 near side wall 210, it is noted that other embodiments place temperature detector 300 more a more horizontally central position in cooking chamber 200. For example, embodiments locate temperature detector 300 (and therefore temperature detector positive motion stop 400) in the middle of back wall 220 both vertically and horizontally. Other combinations of degree of central locating can be used to coordinate with the placement of other features of cooking chamber 200 such as, for example, light fixtures, rack or other support structures, heating units, circulation and/or exhaust fans or associated openings, or other features. For example, temperature detector 300 and temperature detector positive motion stop 400 can be located to the side of a horizontally central position (or above or below a vertically central position) on back wall 220 to avoid conflict with a light fixture. Yet other examples place temperature detector 300 and temperature detector positive motion stop 400 on a side wall of cooking chamber 200.

Figure 8:
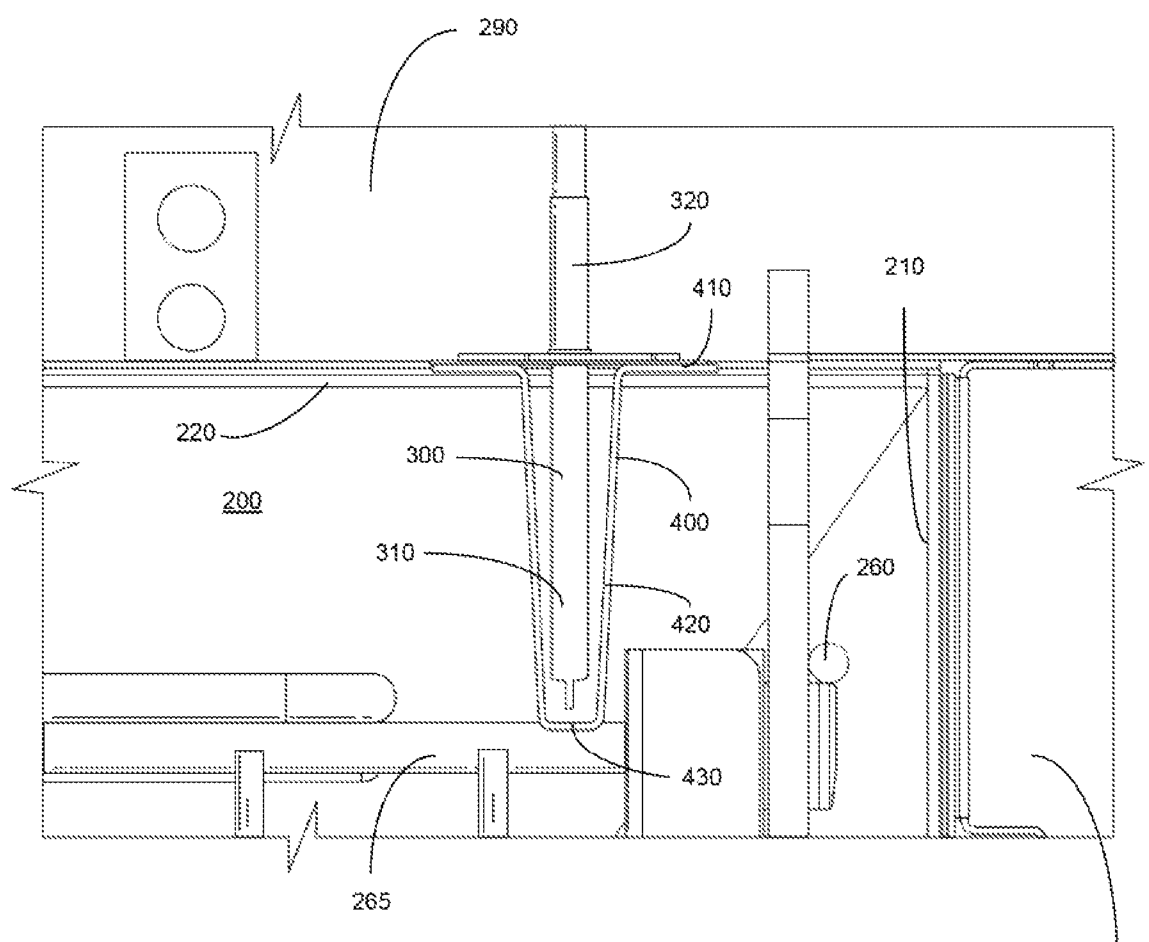
FIG. 8 is a partial top schematic view of a domestic kitchen appliance in accordance with embodiments of the invention.

FIG. 8 is a top view of an exemplary installation of temperature detector 300 and temperature detector positive motion stop 400 that corresponds to FIG. 6. In this figure, in-chamber portion 310 of temperature detector 300 is shown extending into cooking chamber 200 and out of chamber portion 320 of temperature detector 300 is shown extending into an area 290 that is inside appliance 100 but outside of cooking chamber 200. In this example, temperature detector 300 is located closer to side wall 210 than to a horizontally central location in cooking chamber 200. In this example, temperature detector 300 is located in a vertically central location to provide accurate temperature sensing relative to a temperature to which a food item is subjected.

Also shown in FIG. 8 is rack support 260 and rack 265 as representations of structure that exits in various examples of cooking chamber 200. Also shown in FIG. 8 is an area 290 that is inside appliance 100 and is outside of side wall 210 of cooking chamber 200.

An example of temperature detector 300 is a resistive temperature detector. However, other type of temperature detectors can be used as temperature detector 300.

It will be appreciated that variants of the above-disclosed and other features and functions, or alternatives thereof, may be combined into many other different systems or applications. Any of the features described above can be combined with any other feature described above as long as the combined features are not mutually exclusive. Various presently unforeseen or unanticipated alternatives, modifications, variations or improvements therein may be subsequently made by those skilled in the art which are also intended to be encompassed by the invention.

What is claimed is:

1. A domestic cooking appliance for heating a food item, comprising:

a housing;

a cooking chamber located in the housing and having a wall, the cooking chamber being configured to contain the food item while the food item is being heated;

a heating element that provides heat to the cooking chamber for heating the food item;

a temperature detector located in the cooking chamber and configured to detect a temperature in the cooking chamber; and a temperature detector positive motion stop located in the cooking chamber and surrounding a portion of the temperature detector;

wherein the wall has a height within the cooking chamber, a detector location zone is an area having a height equal to 50% of the height of the wall and centered vertically on the wall; and the temperature detector is located in the detector location zone.

2. The domestic cooking appliance of claim 1, wherein the temperature detector positive motion stop is attached to the wall of the cooking chamber.

3. The domestic cooking appliance of claim 2, wherein the temperature detector positive motion stop surrounds an entirety of a portion of the temperature detector that is present in the cooking chamber.

4. The domestic cooking appliance of claim 3, wherein the detector location zone is an area having a height equal to 25% of the height of the wall and centered vertically on the wall.

5. The domestic cooking appliance of claim 4, wherein the temperature detector positive motion stop further comprises a plurality of openings through which air in the cooking chamber is in fluid contact with the temperature detector.

6. The domestic cooking appliance of claim 5, wherein a longitudinal cross-section of the temperature detector positive motion stop is a trapezoid.

7. The domestic cooking appliance of claim 6, wherein the temperature detector positive motion stop is completely open on two opposite sides of the temperature detector positive motion stop.

8. The domestic cooking appliance of claim 1, wherein the temperature detector positive motion stop further comprises a plurality of openings through which air in the cooking chamber is in fluid contact with the temperature detector.

9. The domestic cooking appliance of claim 8, wherein a longitudinal cross-section of the temperature detector positive motion stop is a trapezoid.

10. The domestic cooking appliance of claim 1, wherein the temperature detector extends into the cooking chamber at a right angle to the wall.

11. The domestic cooking appliance of claim 1, wherein the temperature detector extends into the cooking chamber at a right angle to the wall.

12. The domestic cooking appliance of claim 11, wherein the temperature detector positive motion stop further comprises a plurality of openings through which air in the cooking chamber is in fluid contact with the temperature detector.

13. The domestic cooking appliance of claim 12, wherein the temperature detector positive motion stop is completely open on two opposite sides of the temperature detector positive motion stop.

* * * * *